Dec. 25, 1956 D. L. HAYES 2,775,333
AUTOMATIC GUIDE RAIL FOR ROTATABLE-PALLET CONVEYOR SYSTEMS
Filed July 17, 1953 3 Sheets-Sheet 1
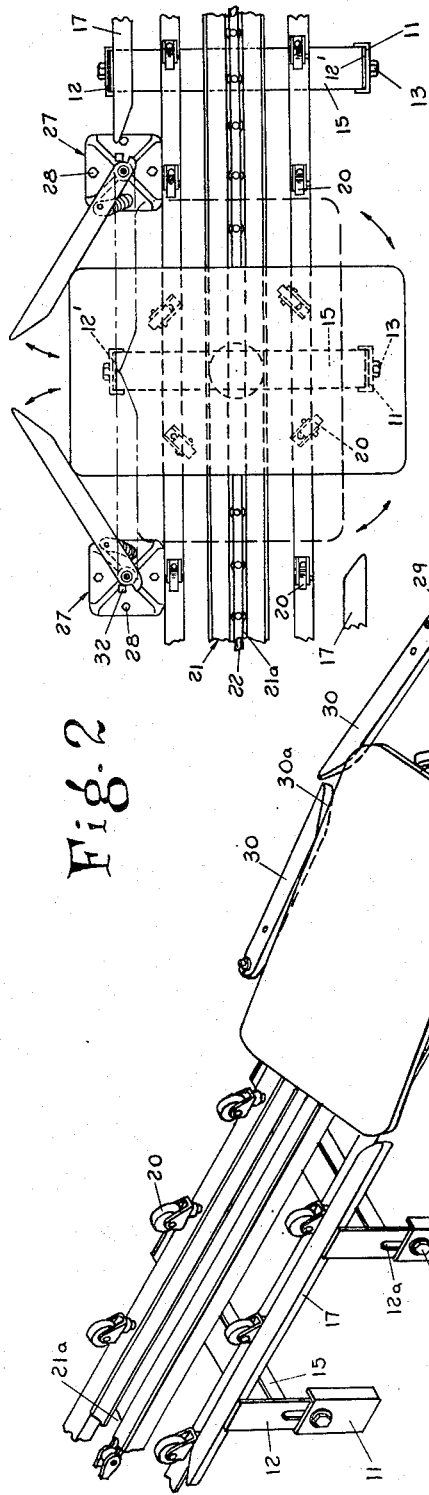
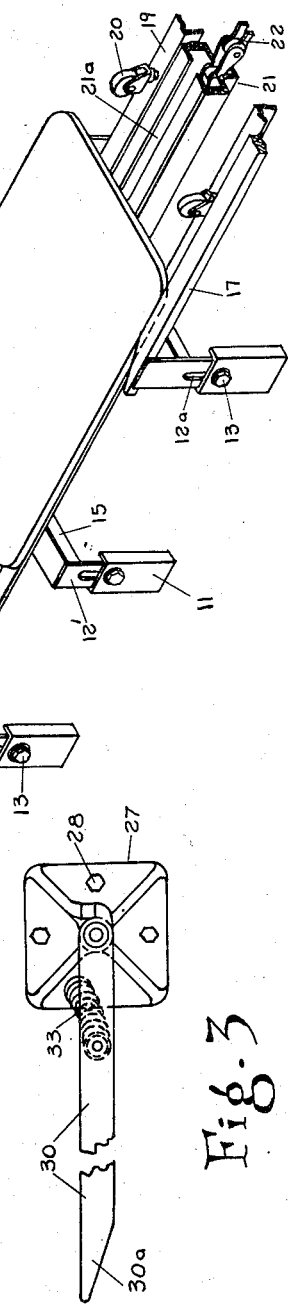
Fig. 1
Fig. 2
Fig. 3
INVENTOR:
Daniel Lee Hayes
BY
Ralph P. Staubly
Attorney Dec. 25, 1956  D. L. HAYES  2,775,333
AUTOMATIC GUIDE RAIL FOR ROTATABLE-PALLET CONVEYOR SYSTEMS
Filed July 17, 1953  3 Sheets-Sheet 2

INVENTOR:
Daniel Lee Hayes
BY
Ralph P. Staubly
Attorney

Dec. 25, 1956     D. L. HAYES     2,775,333
AUTOMATIC GUIDE RAIL FOR ROTATABLE-PALLET CONVEYOR SYSTEMS
Filed July 17, 1953     3 Sheets-Sheet 3
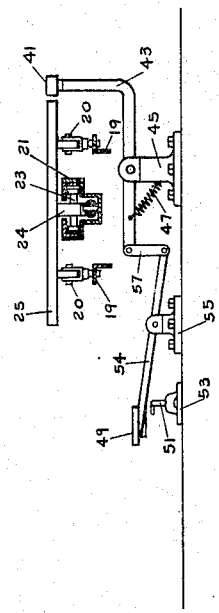
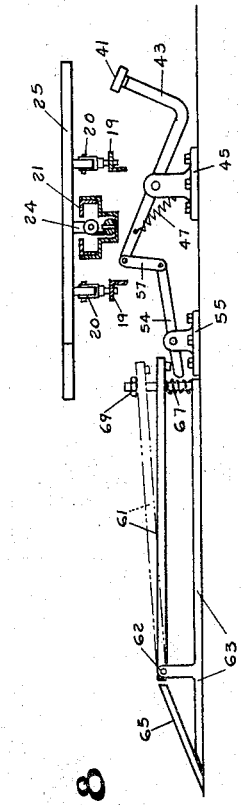
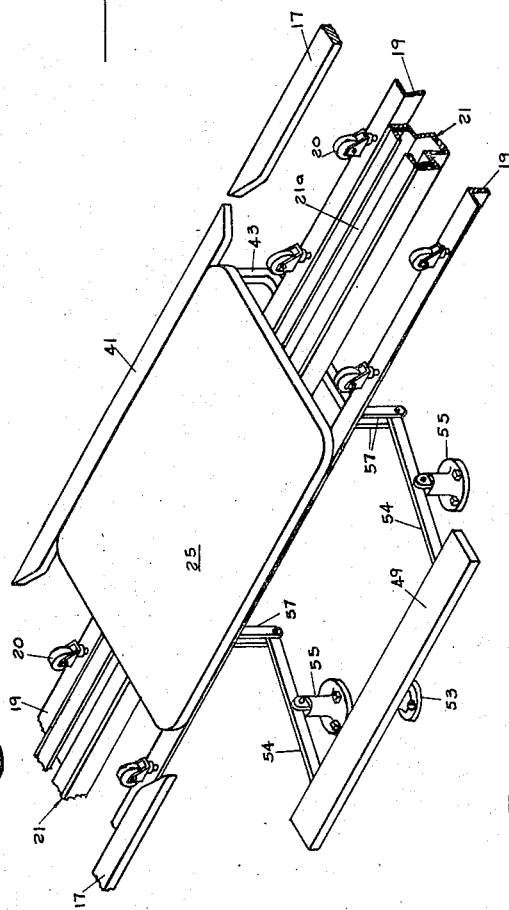
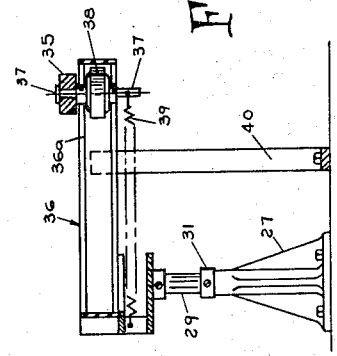
INVENTOR:
Daniel Lee Hayes
BY
Ralph F. Staubly
Attorney United States Patent Office 2,775,333
Patented Dec. 25, 1956

2,775,333
AUTOMATIC GUIDE RAIL FOR ROTATABLE-PALLET CONVEYOR SYSTEMS

Daniel Lee Hayes, Edenwold, Tenn., assignor of fifty percent to Rudolf W. Cisco, Jr., Nashville, Tenn.

Application July 17, 1953, Serial No. 368,601

14 Claims. (Cl. 198—19)

This invention relates to an automatic guide rail for rotatable-pallet conveyor systems.

More particularly it relates to a conveyor system having guide rail which is displaceable from its normal guiding position to permit rotation of elongated work-carrying pallets at work or inspection stations along a continuous conveyor, the movements of said guide rail being automatically responsive to the worker's manual rotation of a pallet or to his standing upon a depressible platform at the work station, or responsive to a manual or foot-operation, the return movement to guiding position being automatic upon cessation of said rail-displacing operations.

In the De Burgh or rotating-pallet conveyor systems, guide rails are placed along the path of travel of the pallets to engage them along at least one of the longer sides of each of the generally rectangular pallets. The guide rails are omitted or are made removable at work or inspection stations so that the pallets can be rotated. However, as the pallet leaves the work station it must be manually alined with the next guide rail to prevent a costly damaging of the apparatus and/or a time-consuming jamming of the conveyor, not to mention the waste in time and effort on the part of the worker who must supervise the departure of one pallet before he can devote his time and effort to arriving work material.

It is accordingly an object of this invention to provide rotating-pallet conveyor with means permitting rotation of pallets at work stations and automatically alining the pallets when abondoned by the operator.

It is another object to provide a gate-type guide rail having spring means for returning the same to guiding position.

It is another object to provide a movable guide rail that is laterally yieldable at a plurality of points along its length.

It is a further object to provide a guide rail movable from guiding position in response to an operator standing upon or otherwise operating a retracting mechanism connected thereto.

These and other objects and advantages of the invention will become apparent as the following detailed description proceeds.

In the drawings, in which like reference characters refer to the same parts throughout the several views:

Fig. 1 is a fragmentary perspective view of a preferred embodiment of the invention.

Fig. 2 is a plan view of the gate portion of the showing of Fig. 1.

Fig. 3 is an enlarged detailed plan view of the right gate of Fig. 2.

Fig. 8 is a fragmentary end elevational view in section taken on the line 8—8 of Fig. 2.

Fig. 9 is a perspective view of a treadle-operated form of the invention.

Fig. 10 is an end elevational view partly in section taken on the line 10—10 of Fig. 9.

Fig. 11 is a view similar to that of Fig. 10, but disclosing a platform-operated modification of the invention.

Figure 6:
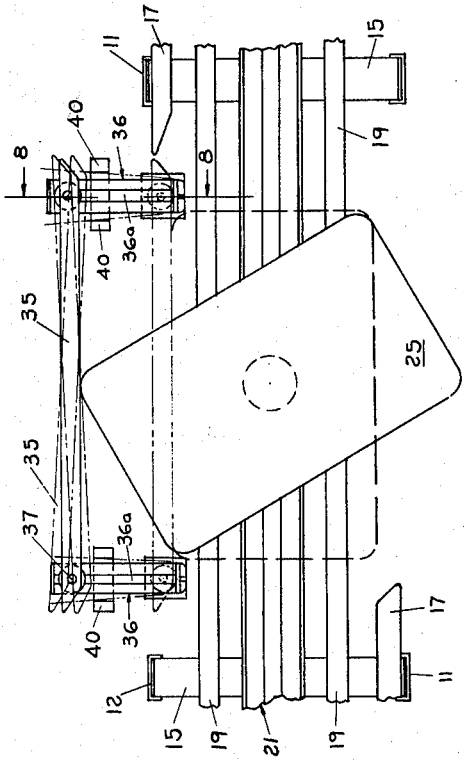
Fig. 6 is a plan view of a guide rail laterally displaceably mounted at both ends.
Figure 7:
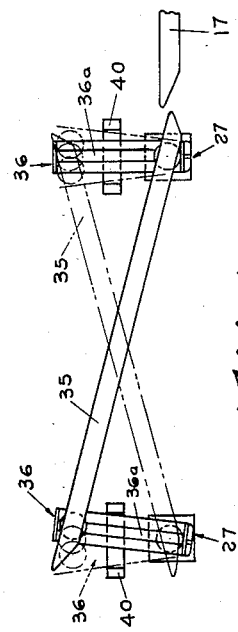
Fig. 7 is a fragmentary plan view of the guide portions of Fig. 6, showing the extreme positions assumable by the movable rail.
Figure 5:
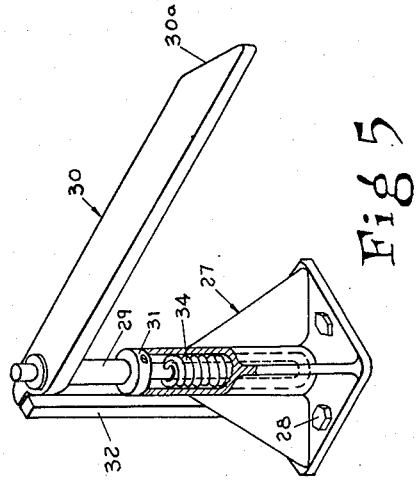
Fig. 5 is a perspective view partly in vertical axial section of a modified form of gate, similar to that of Fig. 4.

With reference now to the drawings, Figs. 1–5 disclose a preferred reduction to practice of the invention employing a pair of horizontally swinging gates. Figs. 6–8 show a modification using a laterally displaceable single guide rail. Figs. 9 and 10 disclose a treadle-operated species. And Fig. 11 depicts a further modification utilizing a depressible platform as the automatic operating mechanism for displacing the guide rail.

In Figs. 1–5, the numeral 11 designates the track-supporting base members which are illustrated as channel-bar members vertically fastened to a floor at spaced intervals by any suitable means (not shown). Support base members 11 guidedly embrace between their lateral flanges support posts 12, which conveniently can be formed of flat steel-bar material. Each post 12 is provided with a longitudinal vertical slot 12a alined with an aperture in each base member 11 so that the track support formed by parts 11 and 12 can be vertically adjustably connected by bolts 13 to permit the apparatus to be elevated to the best height for the workers and for the work material.

Supports 11—12 are located in pairs on opposite sides of the conveyor system (which is basically similar to that disclosed in the De Burgh Patent No. 2,317,675, issued April 27, 1943). Welded or otherwise connected to each pair of support posts 12 is a horizontal transverse truck-support bar 15. The support posts 12 (or at least some of them) extend upwardly above the transverse track supports 15 for attachment thereto of the relatively fixed guide rails 17, which extend along the conveyor so as to engage the sides of the elongated pallets to keep them alined with the conveyor proper. Since the guide rails 17 need to be located on only one side of the conveyor, only those posts supporting the guide rail 17 have to extend above the transverse track supports 15. The shorter posts, including those located at the work or inspection stations (which latter are necessarily short so as not to interfere with the rotation of the pallets) are designated 12'.

The track of the conveyor comprises a pair of parallel angle bars 19 resting upon the cross-tie-like transverse supports 17 and attached thereto by any suitable means (not shown). Angle bars 19 have mounted thereon at desired spaced intervals therealong inverted casters 20 or other low-friction devices for supportingly engaging the under surfaces of the pallets traveling along the conveyor. Centrally of and parallel to the track bars 19 and supported by the transverse supports 15, is the conveyor-chain guide-way 21, which has a T-shaped (in section) longitudinal passage, the lower part of which guidingly carries the (continuously moving) conveyor chain 22, and the upper part of which guides the pusher mechanism 23 (shown only in Fig. 10). Said pusher mechanism 23 engages the centrally located pivot pin 24 on the pallet 25. Pins 24 of pallets 25 extend down into the narrow longitudinal slot 21a of the guide-way 21, by which the pallets are guided along the track while being moved by engagement of pins 24 by pusher mechanisms 23 attached at spaced intervals to and along the drive chain 22.

Figure 4:
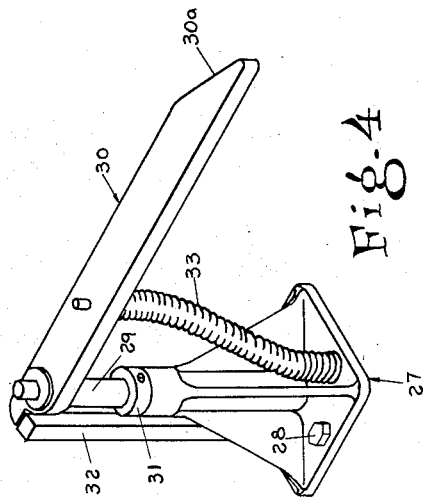
Fig. 4 is an enlarged perspective view of the left gate of Fig. 2.

As shown in Figs. 1 and 2, the guide rails 17 are omitted (or removed) at the work or inspection stations where the pallets are to be rotated. At these stations, according to the Fig. 1–5 species of this invention, a pair of pedestals 27 are fixed to the floor (preferably opposite to the worker's station) as by bolts 28. Each pedestal has a vertical bearing bore to receive a gate-supporting shaft 29. To the top of shafts 29 are attached the horizontally extending gates 30. Shafts 29 are made vertically adjustable in their bearings by axially adjustable collars 31. Any suitable devices, such as stops 32, prevent the gates from swinging too far toward the track proper. In the species of Fig. 4 an external spring 33, while in the species of Fig. 5 an internal torsional spring 34, is employed to automatically return the gates 30 to their pallet-guiding positions. The gates are automatically moved by manual rotation of the pallets 25 by the worker or inspector. Springs 33 and 34 are strong enough to force a disalined pallet back into alinement. Gates 30 obviously could be made of any desired number of sections from one to many, and could take the form of a chain or belt, spring- or weight-pulled into guide-forming condition. The beveled tips 30a of the gates improve and insure their pallet-alining function.

In the species of Figs. 6–8, a single movable guide rail 35 is employed. Pedestals 27 and shafts 29, in this case, support a pair of rearwardly extending hollow guide tubes 36 having alined upper and lower slots 36a to receive the shafts of the guide-rail-supporting pins 37. Pins 37 have rollers 38 thereon, to guide them in the guide housings 36. Tension springs 39 (Fig. 8) yieldably urge the guide rail into its pallet-alining position. One (or both) of the guides 36 is embraced by a U-shaped stop device 40 (or is flanked by a pair of single stop elements) which prevents the guides 36 from swinging by amounts greater than that required to prevent binding when the rail 35 is moved out of parallelism to the track of the conveyor.

In the species of Figs. 9 and 10, the movable guide rail 41 is mounted on a pair of angle arms 43 pivotally supported on a pair of standards 45. One or a pair of tension springs 47 normally hold the guide rail 41 in the pallet-guiding position of Fig. 10. The guide rail 41 is lowerable by foot operation (depression) of the treadle bar 49, which may, if desired, be locked in its down position by any suitable means, such as the rotatable latch 51 journaled in base 53. Treadle 49 is mounted on a pair of arms 54 pivotally fulcrumed on supports 55. The forward ends of arms 54 are attached by links 57 to the free ends of the guide-rail-supporting angle arms 43.

In the modification of Fig. 11, a platform 61, for the worker to stand upon while inspecting or operating upon the work material, is substituted for the treadle 49 used in the previously described species of Figs. 9 and 10. Platform 61 is pivotally attached along its rear edge at 62 to a support 63, which also preferably includes a ramp portion 65. A compression spring 67 normally holds the platform in elevated position against adjustable stop 69, altho spring 47 could be made strong enough to also lift platform 61, if desired. When the worker is standing on platform 61, its forward edge is depressed against the rear ends of arms 54 to move said arms, links 57, angle arms 43 and thereby guide rail 41 to their full-line positions of Fig. 11, thus permitting free rotation of the pallet 25. When the worker leaves the work station the platform rises to its broken-line position of Fig. 11, permitting spring 47 to restore the levers, links and guide rail to their automatic pallet-alining position, as illustrated in Fig. 10.

While I have disclosed by way of examples several preferred forms in which my invention can be reduced to practice, it is to be understood that many changes can be made in the size, shape, composition and arrangements of the parts (for example, by making the guide rail as a flexible and/or elastic bar, ribbon, cable, chain, etc., or by substituting manual, photosensitive or electronic automatic operators for the foot and weight operations disclosed) without departing from the spirit of the invention as defined by the subjoined claims.

Having thus described my invention, what I claim as new and desire to secure by Letters Patent of the United States is:

1. In combination, a horizontally traveling conveyor mechanism, a plurality of horizontally disposed elongated work-supports mounted on said conveyor mechanism for travel therewith and for rotation about a vertically disposed axis whereby work material carried thereby will be accessible from all sides thereof to a worker stationed beside said conveyor mechanism, guide railing for normally alining and holding alined said work-supports, at least a portion of said guide railing being movably mounted whereby the same can be moved out of normal alining position to permit said rotation of said work-supports, and means tending to return said movably mounted portion of said guide railing to alining position automatically upon cessation of application of intentionally produced forces causing displacement thereof from said alining position.

2. Structure according to claim 1 and in which said movable portion of said guide railing comprises at least one gate-like rail section vertically pivotally mounted and having yieldable means associated therewith for urging said section toward pallet-alining position but permitting displacement thereof by a pallet rotated intentionally by a worker.

3. Structure according to claim 2 and in which said urging means comprises at least one spring.

4. Structure according to claim 1 and in which said movable portion of said guide railing comprises a laterally movable bar having its end portions mounted on means forming parts of horizontally disposed guides, and having associated therewith yieldable means for urging said bar toward pallet-alining position but permitting its movement laterally to allow deliberately induced rotation of a pallet beside the same.

5. Structure according to claim 1 and in which said movable portion of said guide railing comprises a bar mounted for displacement away from alining position relative to said pallets, yieldable means urging said bar toward pallet-alining position, and means easily accessible to a worker for moving said bar from said pallet-alining position while leaving the hands of said worker free for other activities.

6. Structure according to claim 5 and in which said last-mentioned means is a leverage system including a foot-engageable and -operable device.

7. Structure according to claim 6 and in which said foot-engageable device is a platform depressible by the weight of said worker.

8. In a conveyor system of the type having a horizontally traveling conveyor mechanism, and a plurality of horizontally disposed elongated work-supports detachably connected to said conveyor for rotation about a vertically disposed axis for convenient access to all sides of work material carried thereon, the improvement comprising guide railing normally alining and holding alined said work-supports, at least a portion of said guide railing being movably mounted whereby the same can be moved out of normal alining position to permit said rotation of said work-supports, and means tending to return said movably mounted portion of said guide railing to alining position automatically upon cessation of application of intentionally produced forces causing displacement thereof from said alining position.

9. Structure according to claim 8 and in which said movable portion of said guide railing comprises at least one gate-like rail section vertically pivotally mounted and having means associated therewith for urging said section toward pallet-aligning position but permitting displacement thereof by a pallet rotated intentionally by a worker.

10. Structure according to claim 9 and in which said urging means comprises at least one spring.

11. Structure according to claim 8 and in which said moveable portion of said guide railing comprises a laterally movable bar having its end portions mounted on means forming parts of horizontally disposed guides, and having associated therewith yieldable means for urging said bar toward pallet-alining position but permitting its movement laterally to allow deliberately induced rotation of a pallet beside the same.

12. Structure according to claim 8 and in which said movable portion of said guide railing comprises a bar mounted for displacement away from alining position relative to said pallets, yieldable means urging said bar toward pallet-alining position, and means easily accessible to a worker for moving said bar from said pallet-alining position while leaving the hands of said worker free for other activities.

13. Structure according to claim 12 and in which said last-mentioned means is a leverage system including a foot-engageable and -operable device, and an optionally usable latch for holding said device in bar-displacing position.

14. Structure according to claim 13 and in which said foot-engageable device is a platform depressible by the weight of said worker.

References Cited in the file of this patent

UNITED STATES PATENTS

| | | |
|---|---|---|
| 1,358,255 | Seufer | Nov. 9, 1920 |
| 1,763,809 | Murphy | June 17, 1930 |
| 2,317,675 | Burgh | Apr. 27, 1943 |
| 2,619,916 | Rainier | Dec. 2, 1952 |